United States Patent
Willis (10) Patent No.: US 12,296,730 B2
(45) Date of Patent: May 13, 2025

(54) INTEGRATED CAR SEAT WITH ADJUSTABLE SUNSHIELD

(71) Applicant: Patricia Willis, Norcross, GA (US)

(72) Inventor: Patricia Willis, Norcross, GA (US)

( * ) Notice: Subject to any disclaimer, the term of this patent is extended or adjusted under 35 U.S.C. 154(b) by 192 days.

(21) Appl. No.: 17/969,796

(22) Filed: Oct. 20, 2022

(65) Prior Publication Data
US 2023/0125490 A1    Apr. 27, 2023

Related U.S. Application Data (60) Provisional application No. 63/270,258, filed on Oct. 21, 2021.

(51) Int. Cl.
| | | |
|---|---|---|
| *B60N 2/30* | (2006.01) | |
| *B60J 1/20* | (2006.01) | |
| *B60N 2/26* | (2006.01) | |
| *B62B 9/14* | (2006.01) | |

(52) U.S. Cl.
CPC ........... *B60N 2/3086* (2013.01); *B60J 1/2011* (2013.01); *B60N 2/274* (2023.08); *B60N 2/271* (2023.08); *B60N 2230/20* (2023.08); *B62B 9/142* (2013.01)

(58) Field of Classification Search
CPC ........ B60N 2/3086; B60N 2/26; B60N 2/274; B60N 2/265; B62B 9/142
USPC .................................. 297/254, 255, 184.13
See application file for complete search history.

(56) References Cited

U.S. PATENT DOCUMENTS

| | | | | |
|---|---|---|---|---|
| 7,517,016 | B1* | 4/2009 | West | B60N 2/3086 |
| | | | | 297/240 |
| 10,793,031 | B1* | 10/2020 | Daniels | B60N 2/2866 |
| 2009/0008975 | A1* | 1/2009 | Behrens | B60N 2/3045 |
| | | | | 297/236 |
| 2023/0083296 | A1* | 3/2023 | Martinez | B60N 2/5685 |
| | | | | 297/250.1 |

FOREIGN PATENT DOCUMENTS

| | | | | |
|---|---|---|---|---|
| GB | 2427130 A | * | 12/2006 | ........... B60N 2/2821 |
| GB | 2581453 A | * | 8/2020 | ............... B62B 7/14 |

* cited by examiner

*Primary Examiner* — David R Dunn
*Assistant Examiner* — Tania Abraham
(74) *Attorney, Agent, or Firm* — Dale J. Ream (57) ABSTRACT

A child car seat is selectively movable between a stowed configuration in a storage area defined by a base portion of a rear passenger seat of an automobile and a deployed configuration positioned against the rear passenger seat. The car seat may be deployed when needed or stowed inside the base portion when not needed. A sun shielding assembly is mounted to a top edge of the child car seat and is adjustable according to remote control signals received from a transmitter that may be positioned near a driver of the automobile.

19 Claims, 8 Drawing Sheets

INTEGRATED CAR SEAT WITH ADJUSTABLE SUNSHIELD

REFERENCE TO RELATED APPLICATIONS

This application claims the benefit of provisional patent application No. 63/270,258 filed Oct. 21, 2021 and titled Integrated Car Seat with Adjustable Sunshield, which is incorporated in its entirety.

BACKGROUND OF THE INVENTION

This invention relates generally to child car seats and, more particularly, to a child car seat integrated in a rear passenger seat of an automobile and that includes a sun visor that may operated remotely.

A child safety seat, also referred to as an infant safety seat, a child restraint system, a child seat, a baby seat, a car seat, or a booster seat, is a seat specifically designed for protecting children from injury or death during vehicle collisions. Most commonly these seats are purchased and installed by car owners. Further, some car manufacturers actually integrate a child safety seat directly into their vehicle's design and generally are required to provide anchors and ensure seat belt compatibility. This allows the child safety seat to pop out when needed and be retracted when it is not.

Another problem that is common to all passengers in a vehicle but particularly problematic to infants and toddlers is the heat and brightness caused by direct sunlight shining through an automobile window. This is especially experienced in a car seat that is rearwardly facing the rear window of the automobile and receiving direct evening sun.

Various devices and proposals have been advanced for relieving direct and excessive heat and brightness upon a child seated in a car seat in a vehicle. Although presumably effective for their intended purposes, many sun visor solutions are not adequately adjustable to shield the car seat as the sun changes position or the direction of the vehicle changes. In addition, the prior existing solutions would require a driver to stop the automobile and manually adjust the sun visor whenever the direction of travel has changed.

Therefore, it would be desirable to have the advantages of a child car seat integrated into a rear passenger seat of an automobile and that includes a sun visor for shielding a child from the sun's rays and that may be positioned by remote control. Further, it would be desirable to have a child car seat having a seat sensor configured to prevent a shoulder strap buckle from latching into the seat until the baby sitting there is properly positioned.

SUMMARY OF THE INVENTION

Therefore, a general object of this invention is to provide a child car seat apparatus that is integrated into a rear passenger seat of an automobile and that is movable between a stowed configuration substantially inside a portion of the rear passenger seat and a deployed configuration that is external and positioned on the rear passenger seat.

Another object of this invention is to provide an integrated child car seat apparatus, as aforesaid, that includes a sun shield (a.k.a. a sun visor) that is selectively movable as desired for blocking sunrays from the infant in the car seat.

Still another object of this invention is to provide a child car seat apparatus, as aforesaid, in which the sun shield is movable when actuated by remote control.

A further object of this invention is to provide a child car seat apparatus as aforesaid, having a configuration wherein the shoulder strap seat buckle will not latch into a selected seat opening until a sensor pad in the seat indicates that the occupant (e.g., a baby or toddler) is properly positioned on the seat.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

An integrated child car seat apparatus according to a preferred embodiment of the present invention will now be described with reference to FIG. 1a to 7b of the accompanying drawings. The integrated child car seat apparatus 10 includes a rear passenger seat 12 having a lower section 13a defining a storage area 18, a child car seat 20, a sun shielding assembly 30 that is operable via remote control signals, and a latch blocking assembly 50. It will be understood that said remote control signals may be radio signals.

With further reference to the child car seat 20, the child car seat 20 may include a child seat back portion 22 extending upwardly from a rear edge of the lower section 13a and that, together, form a seat suitable to receiving an infant or toddler in a seated configuration. In other words, the child car seat 20 may have a configuration substantially similar to a traditional booster seat.

In another aspect, the rear passenger seat 12 is positioned in a cabin of an automobile and has a construction that enables one or more passengers to be seated thereon. More particularly, the rear passenger seat 12 includes a lower section 13a and an upper section 13b pivotably coupled to the lower section 13a upon which a person may sit (when closed), such as when riding as a passenger in the automobile. Even more particularly, the upper section 13b is pivotally movable between a closed configuration (FIG. 1a) preventing access to the storage area 18 and an open configuration (FIG. 3) allowing access to the storage area 18 Further, the rear passenger seat 12 may include a seatback 16 that extends upwardly from a rear edge of the lower section 13a, the seatback 16 having a generally rectangular configuration operative to support a seated passenger leaning back.

Figures 1A, 1B, 1C:
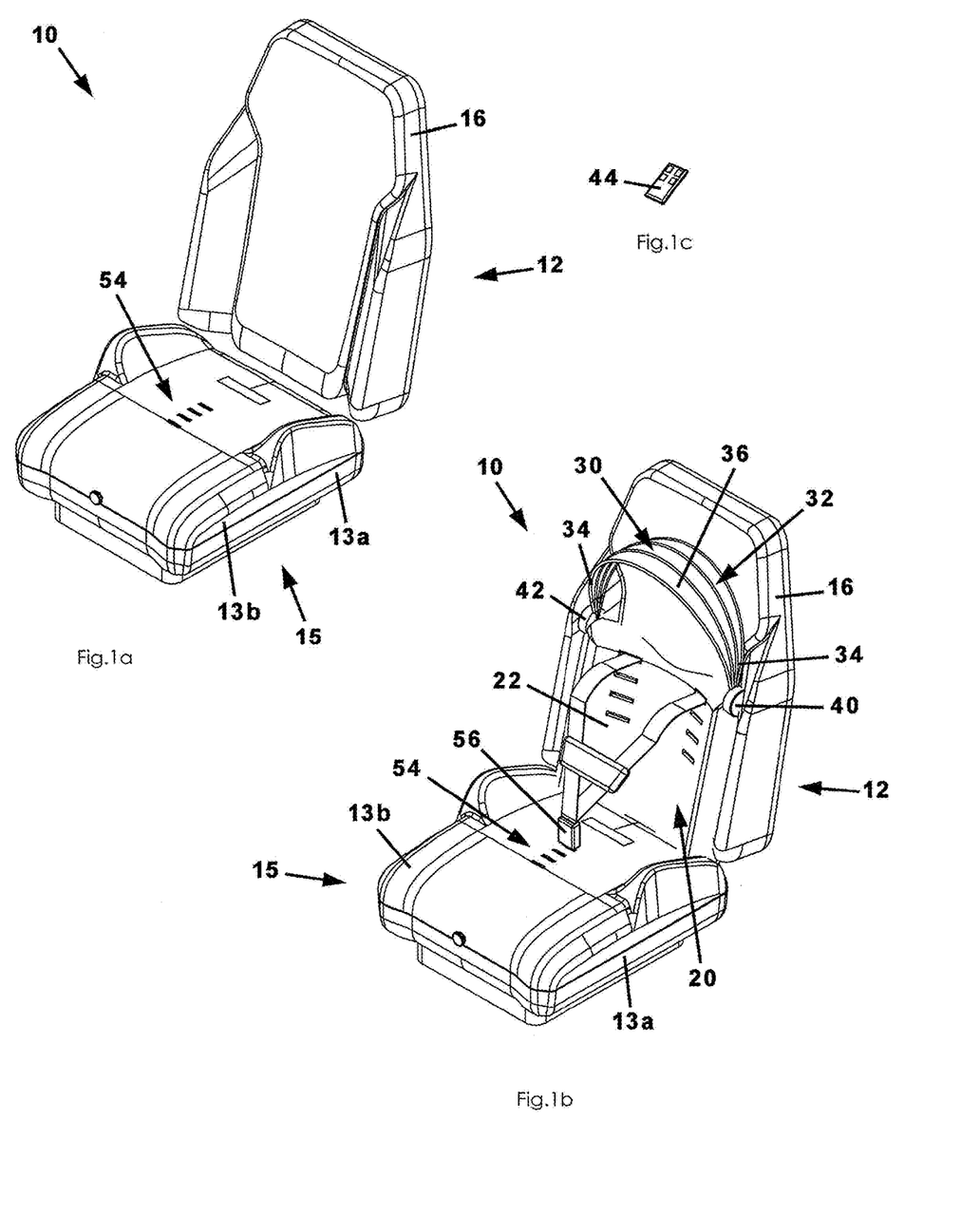
FIG. 1a is a perspective view of an integrated car seat apparatus according to a preferred embodiment of the present invention, illustrated in a fully stowed configuration.
FIG. 1b a perspective view of the integrated car seat apparatus as in FIG. 1a, illustrated in a fully deployed configuration.
FIG. 1c is a perspective view of a remote control device according to the present invention.
Figure 2:
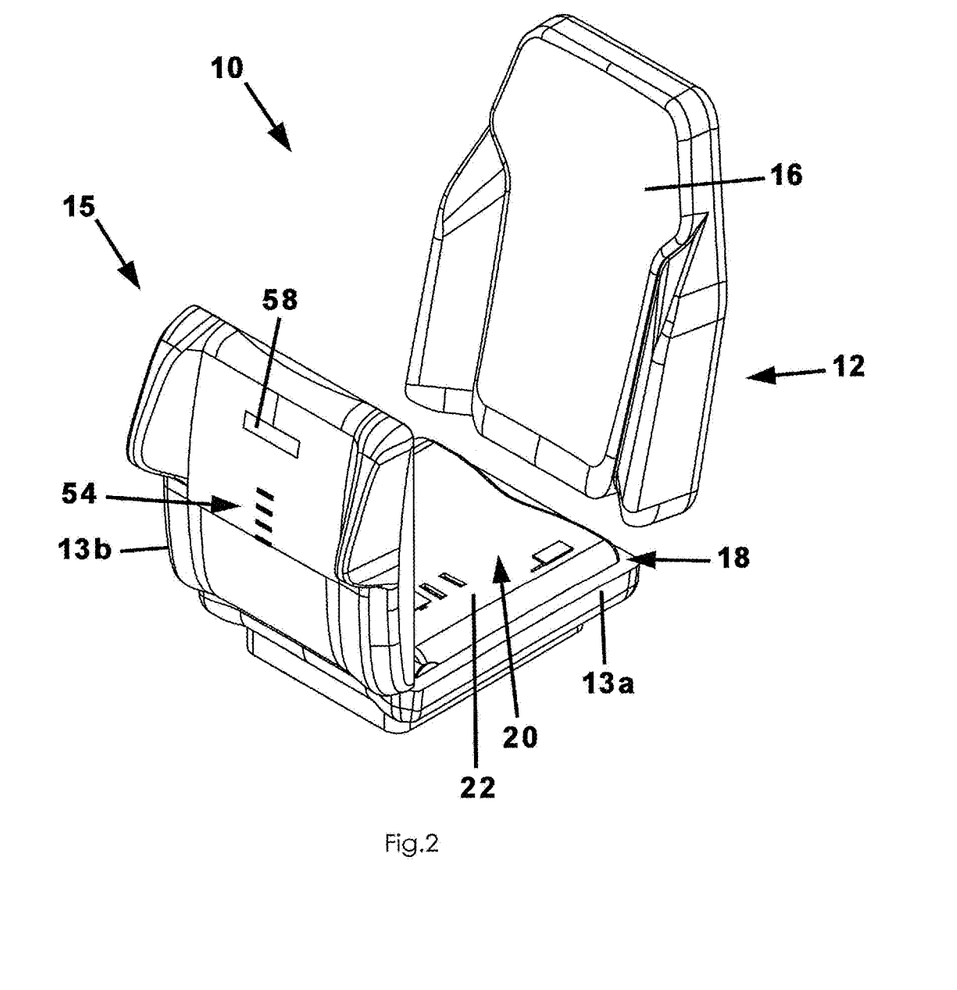
FIG. 2 is a partially exploded view of the integrated car seat apparatus according to the present invention, illustrated in an intermediate configuration of deployment.
Figure 3:
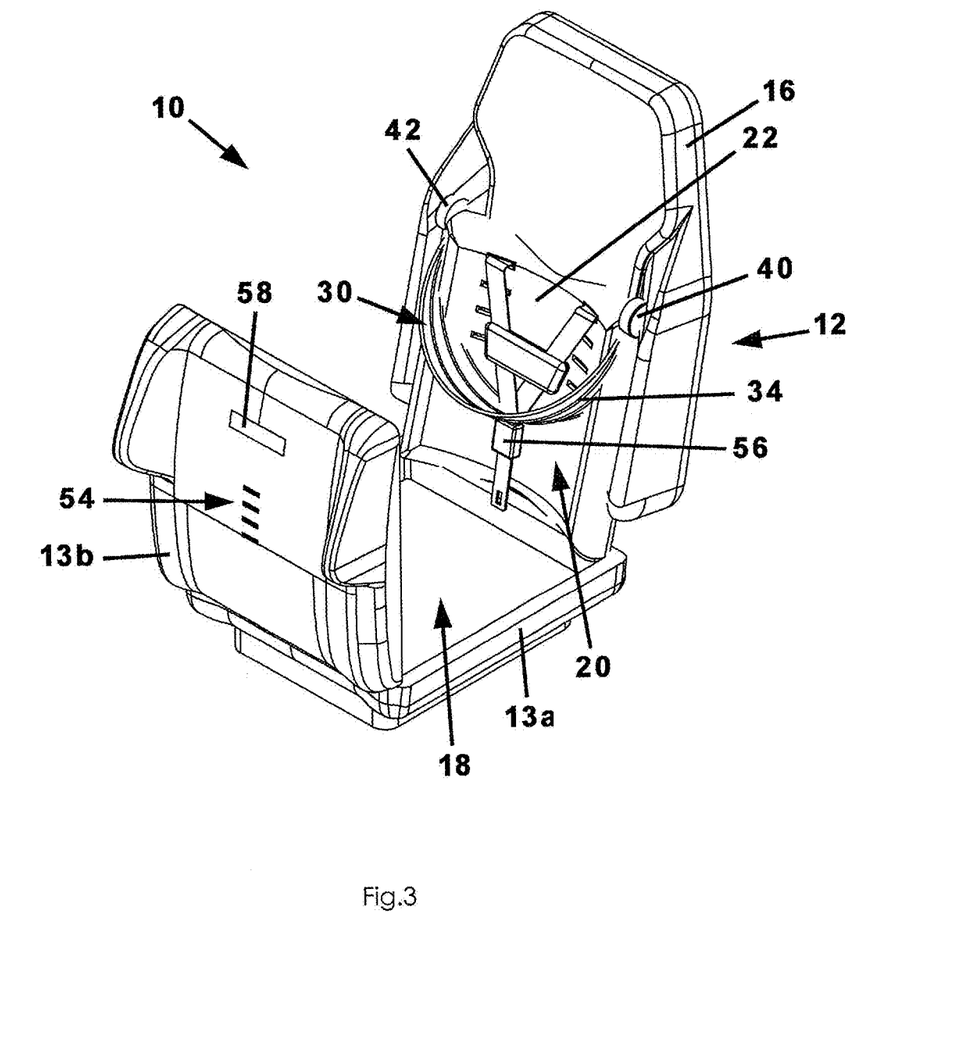
FIG. 3 is a perspective view of the integrated car seat apparatus, illustrated in another intermediate configuration of deployment.
Figure 4:
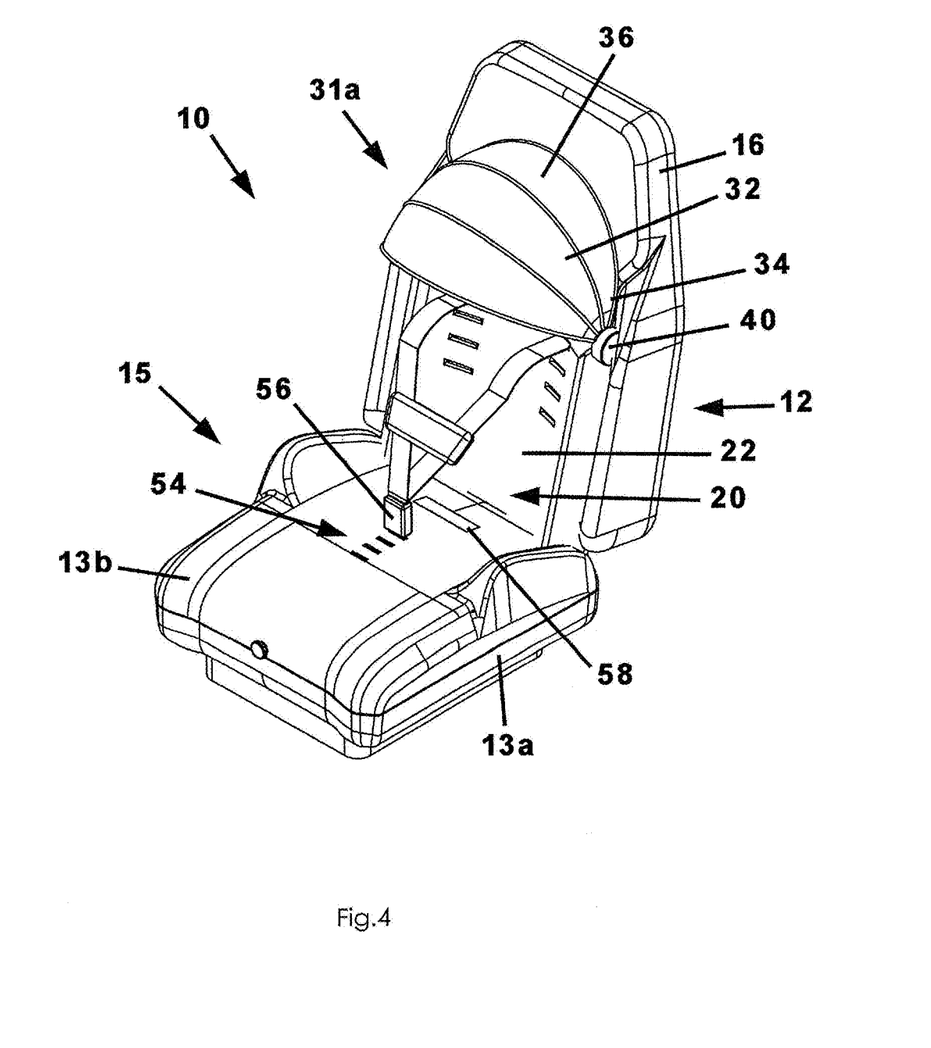
FIG. 4 is a perspective view of the integrated car seat apparatus, illustrated in a fully deployed configuration.

In an embodiment and as shown in FIGS. 1 and 2, a base portion 15 includes a lower section 13a is the bottom of the seat and defines a storage area 18. Further, a top surface of the upper section 13b is the seating surface when the child seat is deployed and also when stowed. In other words, the child car seat 20 may only include a back portion 22 as the upper section 13b serves dual purpose to support an adult passenger when the car seat 20 is stowed in the storage area 18 and also a toddler when the car seat 20 is deployed.

The integrated child car seat 20 is moved between deployed and stowed configurations as follows: the back portion 22 of the car seat 20 may be pivotably coupled to a rear edge of the lower section 13a and pivotally movable between the stowed configuration laying inside the storage area 18 (FIG. 3) and the deployed configuration bearing against the seatback 16 of the rear passenger seat 12 (FIG. 2).

Figure 7A:
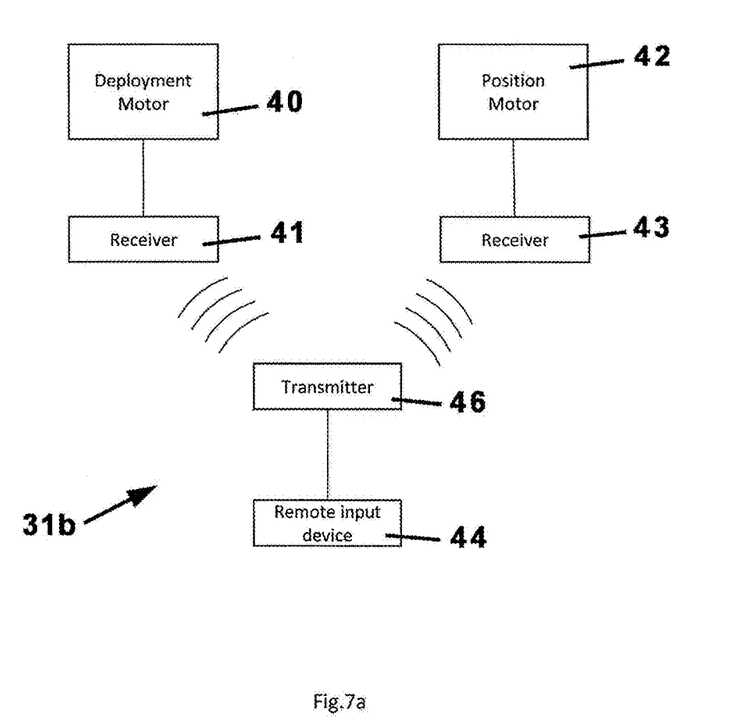
FIG. 7a is a block diagram illustrating the electronic components associated with the sun shield device according to the present invention.
Figure 7B:
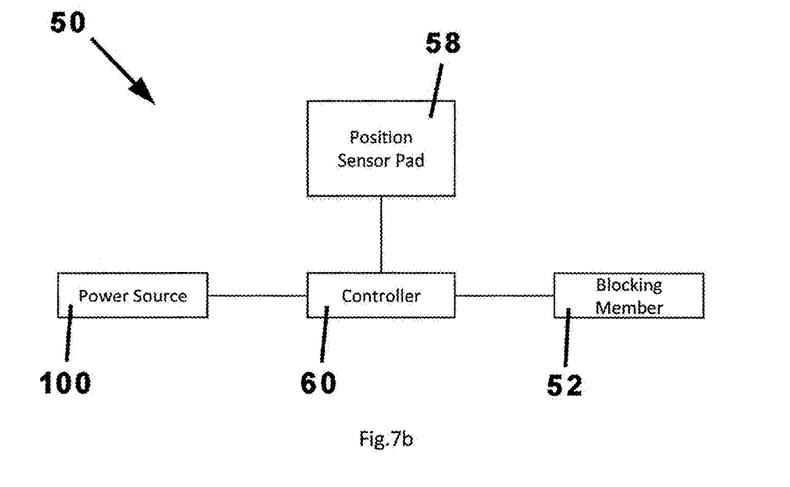
FIG. 7b is a block diagram illustrating the electronic components associated with a blocking assembly according to the present invention.

In another aspect, the upper section 13b of the base portion 15 defines a plurality of latch slots 54 slightly separated from one another along an imaginary central longitudinal axis, each slot being configured to selectively receive a strap buckle 56 so as to secure a holding strap over the shoulders of an infant seated atop the upper section 13b when the upper section 13b is in the fully deployed configuration (FIG. 1b). More particularly, and as an additional safety precaution, the integrated child car seat 20 includes a latch blocking assembly 50 situated on a bottom surface of the upper section 13b and configured to block access to the plurality of latch slots 54 until a baby is properly seated upon a top surface of the upper section 13b (FIG. 7b). In general, the latch blocking assembly 50 is positioned to prevent or block the strap buckle 56 from being inserted through a selected latch slot 54 until a child position sensor pad 58 detects a baby has been properly positioned on the upper section 13. It is understood that in an embodiment, the latch blocking assembly 50 may include blocking member 52 such as a solenoid that is in data communication with a processor or controller 60 configured to actuate the solenoid to block the slots 54 until the child position sensor pad 58 indicates proper positioning of a seated child. It would be understood by one of ordinary skill in the art that a solenoid is an electromechanical device that may include a housing having a flange (such as a tab, button, or rod) that is slidably movable between a retracted configuration inside said housing and an extended configuration extending forwardly or outwardly away from the housing when energized or actuated. In the embodiment described above, the solenoid may be actuated to block the slots 54 until actuated by the child position sensor pad 58 indicates the proper positioning of a seated child E.

In a critical aspect, the integrated child car seat apparatus 10 includes a sun shielding assembly 30 that enables a sun shield (aka a sun visor) to be positioned at a desired position relative to the child car seat 20 by receiving and being actuated by remote control signals initiated by a driver of the automobile. More particularly, the sun shielding assembly 30 includes two elements; namely, the sun shielding portion 31a coupled to the child car seat 20 and the control portion 31b mounted in the automobile cabin proximate to the driver. In an embodiment, control portion 31b may be implemented via a mobile software application. The sun shielding portion 31a includes a plurality of shielding flaps 32 coupled to one another in an accordion configuration, each shielding flap 32 having a pair of opposed ends that overlap respective opposed ends of an adjacent shielding flap 32. Further, each opposed end has a narrow width. By contrast, the plurality of shielding flaps 32 includes a center section 36 having a wider width than that of its respective opposed ends 34.

Collectively, each plurality of opposed ends 34 is operatively coupled to an adjustment motor and is actuated thereby as described below. In other words, a pair of adjustment motors 40, 42 is coupled to upper ends of the child car seat back portion 22. Each adjustment motor 40, 42 is in data communication with receivers 41, 43 the receivers 41, 43 being configured to receive remote control signals (i.e., radio signals) indicative of adjustment commands that cause the plurality of shielding flaps 32 to move between a collapsed configuration and an expanded configuration.

It will be understood that operation of electronics, motors, and other low electrical components described above may be electrically connected to the vehicle's battery, one or more internally positioned batteries, or another power source 100 (FIG. 7b).

In a related aspect, the control portion 31b may include a remote input device 44 that may be positioned proximate a driver of the automobile and configured to enable the driver to press selective input buttons so as to generate signals to be sent from a transmitter 46 and then received by a respective receiver described above (see FIG. 7a). The remote input device 46 may include a plurality of buttons associated with position adjustment and deployment adjustment. In an embodiment, there may be two motors 41, 43. A first motor 40 (also referred to as a deployment motor) is operatively and electromechanically coupled to the plurality of shielding flaps 32, such as with a gear train or series of levers or the like, configured to move the flaps between a compressed configuration (e.g., a closed configuration) and an expanded configuration (e.g., an open configuration) for shielding a baby from sun rays. In other words, the first motor 40 is operative to spread out the shielding flaps 32. More particularly, the first motor 40 may be mechanically connected to at least one of the shielding flaps 32, the front edge of the plurality of shielding flaps, or to each of the ribs separating the plurality of shielding flaps 32.

A second motor 42 (also referred to as a position motor) is operatively coupled to the plurality of shielding flaps 32 and is configured to move the entire plurality of shielding straps relative to the car seat 20. For instance, actuation of the second motor 42 may cause the entire shielding portion to tip forwardly (i.e., a forward angular movement) or to tip rearwardly (i.e., a rearward angular movement) but otherwise does not affect deployment of the plurality of the shielding flaps 32. More particularly, the second motor 42 may be mechanically coupled to the axle or hub about which the plurality of shielding flaps 32 rotate between compressed and expanded configurations. In other words, when the entire axle or hub is rotated, the entire shielding flap assembly is tilted forwardly or rearwardly, respectively.

Figures 5A, 5B, 5C:
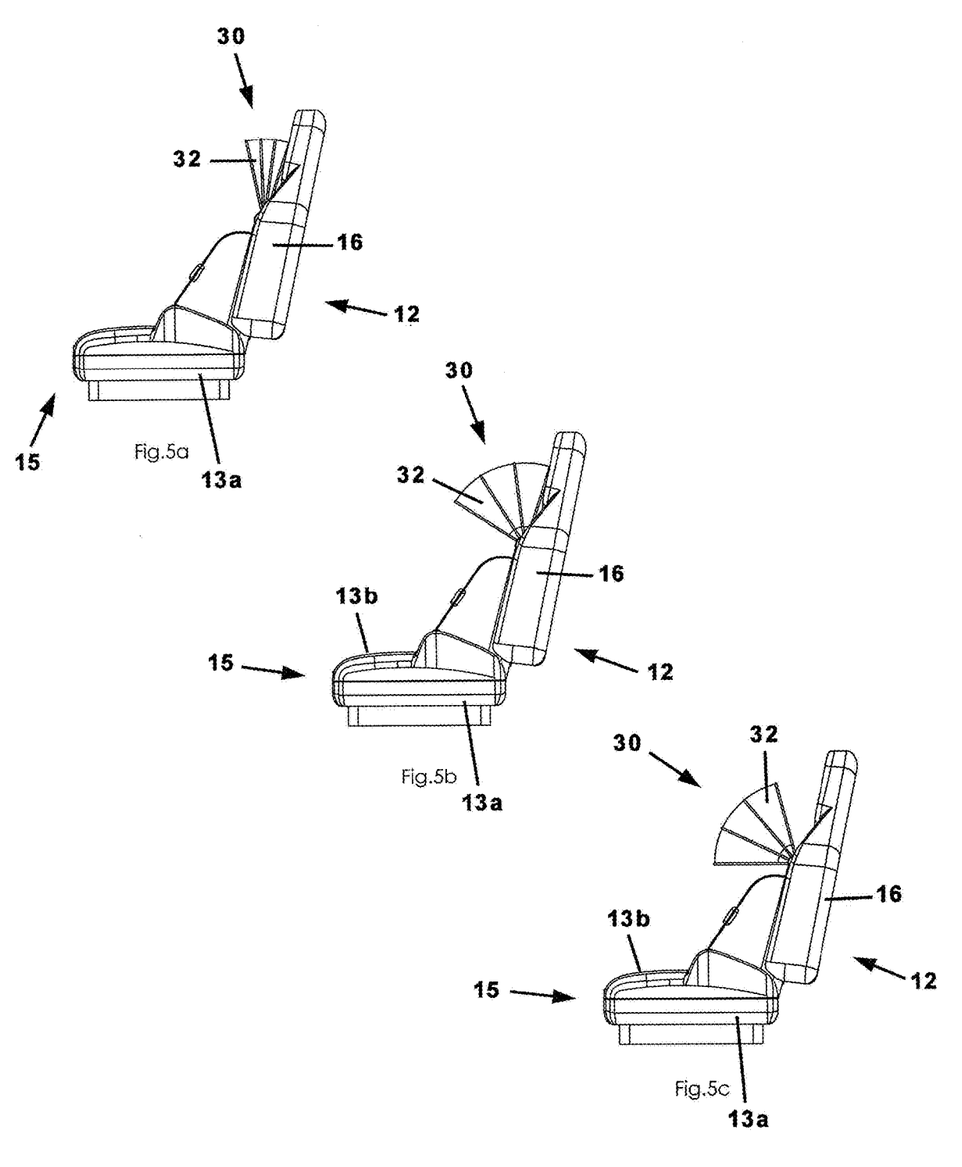
FIG. 5a is a side view of the integrated car seat apparatus as in FIG. 4, illustrated with the sun shielding assembly in an upright and collapsed configuration.
FIG. 5b is a side view of the integrated car seat apparatus as in FIG. 5a, illustrated with the sun shielding assembly in an upright and deployed configuration.
FIG. 5c is a side view of the integrated car seat apparatus as in FIG. 4, illustrated with the sun shielding assembly angularly adjusted forwardly and fully deployed.
Figure 6A:
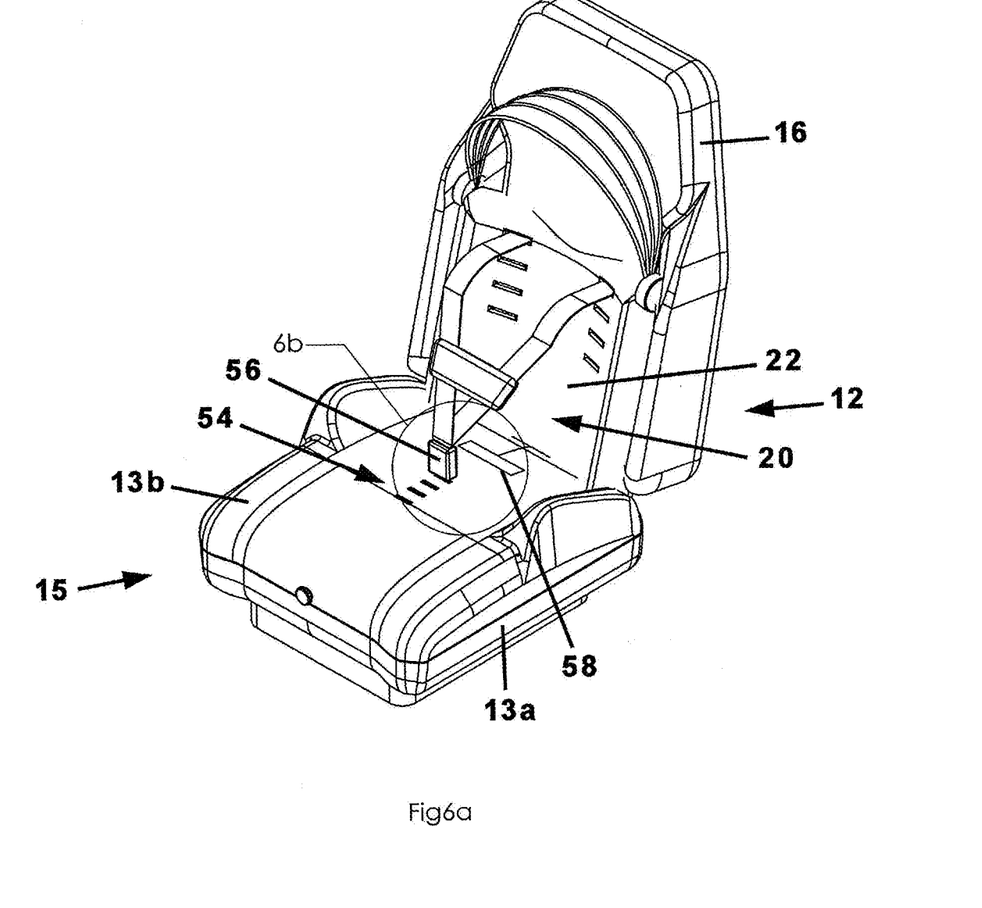
FIG. 6a is a block diagram illustrating the electronic components associated with the sun shield device according to the present invention.
Figure 6B:
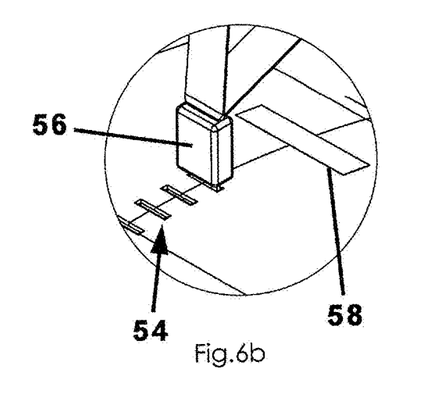
FIG. 6b is an isolated view on an enlarged scale taken from FIG. 6a, illustrated with the buckle in a latched configuration.
Figure 6C:
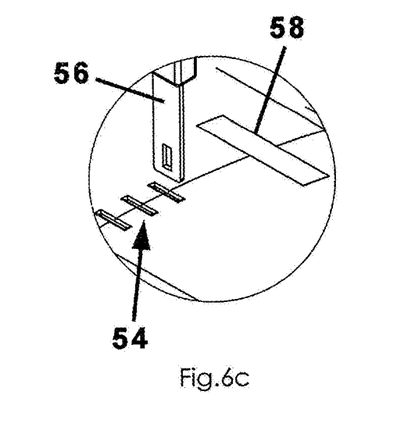
FIG. 6c is an isolated view on an enlarged scale taken from FIG. 6a, illustrated with the buckle in an unlatched configuration.

Operation of the sun shielding assembly 30 and, more particularly, operation of the receivers 41, 43 and associated motors 40, 42, is shown in FIGS. 5a to 5c. The driver may press an appropriate adjustment button on the remote input device 44 (FIG. 1c), causing an appropriate signal to be transmitted via the transmitter 46 and received by receiver 41 which causes the adjustment motor 42 either deploy the plurality of shielding flaps 32 or, if already deployed, to compress them, as shown in FIGS. 5 and 5a, respectively. Similarly, the entire sun shielding assembly 30 may be angularly moved forwardly or rearwardly. More particularly, the driver may press an appropriate adjustment button on the remote input device before, causing an appropriate signal to be transmitted via the transmitter 46 and received by receiver 43 which causes the angular adjustment motor 42 to move the entire plurality of shielding flaps 32 forwardly or, if already moved forwardly, then rearwardly, as shown in FIG. 5c.

In use, a child car seat 20 may be mounted atop an upper section 13b of a rear passenger seat of an automobile and selectively moved to the stowed configuration inside the storage area 18 as shown and described above. When the car seat 20 is deployed against the seatback 16 and a baby is received into the child car seat 20, the remote input device 44 may be operated to adjust an angular position of the entire shielding portion 31a of the sun shielding assembly 30 or to retract/expand the plurality of shielding flaps 32, It is understood that while certain forms of this invention have been illustrated and described, it is not limited thereto except insofar as such limitations are included in the following claims and allowable functional equivalents thereof.

The invention claimed is:

1. An integrated child car seat apparatus mounted in an automobile having a driver cabin and a rear passenger seatback, said car seat apparatus comprising:
   a base portion having a lower section and an upper section pivotally coupled to a front edge of the lower section that, together, define an interior area, said upper section being pivotally movable between a closed configuration preventing access to said interior area and an open configuration allowing access to said interior area;
   a child car seat having a back edge pivotably coupled to a rear edge of the lower section and, when the upper section is in the open configuration, is pivotally movable between a stowed configuration situated inside the storage area and a deployed configuration bearing against the rear passenger seatback;
   wherein a front surface of said child car seat includes a strap and a strap buckle;
   wherein said upper section of said base portion defines a plurality of latch slots each being configured to receive said strap buckle when said back portion of said child car seat is in said deployed configuration and said upper section of said base portion is at said closed configuration;
   a sun shielding assembly, comprising:
      a sun shielding portion having a plurality of shielding flaps coupled to one another in an accordion configuration, each shielding flap having a pair of opposed ends that overlap respective opposed ends of an adjacent shielding flap;
   a control portion that includes a remote input device mounted in the driver cabin and having a transmitter operative to transmit signals indicative of movements of said plurality of shielding flaps;
   wherein said sun shielding portion includes a receiver configured to receive said signals and to actuate said plurality of shielding flaps to move between compressed and expanded configurations according to said signals, respectively.

2. The car seat apparatus as in claim 1, wherein said sun shielding portion includes an adjustment motor coupled to said opposed ends of said plurality of said shielding flaps for moving said plurality of flaps when actuated.

3. The car seat apparatus as in claim 1, wherein said control portion includes a software application implemented via a smart telephone.

4. The car seat apparatus as in claim 1, wherein said plurality of shielding flaps each includes a center section having a width that is wider than a width of said opposed ends, respectively.

5. The car seat apparatus as in claim 1, wherein said sun shielding portion includes:
   a first motor electromechanically coupled to the plurality of shielding flaps and is operatively configured to move the plurality of shielding flaps between said compressed configuration and said expanded configuration when energized; and
   a second motor electromechanically coupled to the plurality of shielding flaps and is operatively configured to cause the plurality of shielding flaps to tip forwardly or rearwardly when energized.

6. The car seat apparatus as in claim 1, wherein said control portion includes a plurality of input buttons corresponding to movements of said plurality of shielding flaps.

7. The car seat apparatus as in claim 1, further comprising a latch blocking assembly mounted on a bottom surface of the upper section of the base portion adjacent said plurality of latch slots, said latch blocking assembly including a blocking member that is configured to block the latch slots from receiving said strap buckle when actuated.

8. The car seat apparatus as in claim 7 wherein said blocking member is a solenoid having a flange that extends outwardly when actuated.

9. The car seat apparatus as in claim 8, further comprising a child position sensor pad in physical communication with a top surface of said upper section of said base portion and in data communication with a controller that is in the electrical communication with said blocking member, said controller configured to actuate said blocking member to unblock said latch slots when said child position sensor pad is indicative that a child is properly positioned on said upper section of said base portion.

10. The car seat apparatus as in claim 1, wherein a top surface of said upper section of said base portion includes a padded construction.

11. The car seat apparatus as in claim 1, wherein said sun shielding portion includes:
   a first motor electromechanically coupled to the plurality of shielding flaps and is operatively configured to move the plurality of shielding flaps between said compressed configuration and said expanded configuration when energized; and
   a second motor electromechanically coupled to the plurality of shielding flaps and is operatively configured to cause the plurality of shielding flaps to tip forwardly or rearwardly when energized.

12. An integrated child car seat apparatus mounted in an automobile having a driver cabin and a rear passenger seatback, said car seat apparatus comprising:
- a base portion having a lower section and an upper section pivotally coupled to a front edge of the lower section that, together, define an interior area, said upper section being pivotally movable between a closed configuration preventing access to said interior area and an open configuration allowing access to said interior area; and
- a child car seat having a back edge pivotably coupled to a rear edge of the lower section and, when the upper section is in the open configuration, is pivotally movable between a stowed configuration situated inside the storage area and a deployed configuration bearing against the rear passenger seatback;
- a latch blocking assembly mounted on a bottom surface of the upper section of the base portion adjacent said plurality of latch slots, said latch blocking assembly including a blocking member that is configured to block the latch slots from receiving said strap buckle when actuated;
- wherein a front surface of said child car seat includes a strap and a strap buckle;
- wherein said upper section of said base portion defines a plurality of latch slots each being configured to receive said strap buckle when said back portion of said child car seat is in said deployed configuration and said upper section of said base portion is at said closed configuration.

13. The car seat apparatus as in claim 12 wherein said blocking member is a solenoid having a flange that extends outwardly when actuated.

14. The car seat apparatus as in claim 13, further comprising a child position sensor pad in physical communication with a top surface of said upper section of said base portion and in data communication with a controller that is in the electrical communication with said blocking member, said controller configured to actuate said blocking member to unblock said latch slots when said child position sensor pad is indicative that a child is properly positioned on said upper section of said base portion.

15. The car seat apparatus as in claim 14, further comprising a sun shielding assembly including:
- a sun shielding portion having a plurality of shielding flaps coupled to one another in an accordion configuration, each shielding flap having a pair of opposed ends that overlap respective opposed ends of an adjacent shielding flap; and
- a control portion that includes a remote input device mounted in the driver cabin and having a transmitter operative to transmit signals indicative of movements of said plurality of shielding flaps;
- wherein said sun shielding portion includes a receiver configured to receive said signals and to actuate said plurality of shielding flaps to move between compressed and expanded configurations according to said signals, respectively.

16. The car seat apparatus as in claim 15, wherein said sun shielding portion includes an adjustment motor coupled to said opposed ends of said plurality of shielding flaps for moving said plurality of flaps when actuated.

17. The car seat apparatus as in claim 15, wherein said plurality of shielding flaps each includes a center section having a width that is wider than a width of said opposed ends, respectively.

18. The car seat apparatus as in claim 15, wherein said control portion includes a software application implemented via a smart telephone.

19. The car seat apparatus as in claim 18, wherein said control portion includes a plurality of input buttons corresponding to movements of said plurality of shielding flaps.

* * * * *